(12) United States Patent
Fleischman et al.

(10) Patent No.: US 7,671,324 B2
(45) Date of Patent: Mar. 2, 2010

(54) ANTI-TAMPER ENCLOSURE SYSTEM COMPRISING A PHOTOSENSITIVE SENSOR AND OPTICAL MEDIUM

(75) Inventors: Scott G. Fleischman, Palmetto, FL (US); Kara L. Warrensford, Tampa, FL (US); James L. Tucker, Clearwater, FL (US); William J. Dalzell, Parrish, FL (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 11/859,466

(22) Filed: Sep. 21, 2007

(65) Prior Publication Data
US 2008/0073491 A1    Mar. 27, 2008

Related U.S. Application Data

(60) Provisional application No. 60/827,190, filed on Sep. 27, 2006.

(51) Int. Cl.
*G01J 1/04*    (2006.01)
*G01J 1/42*    (2006.01)
*G01J 5/08*    (2006.01)

(52) U.S. Cl. .................... 250/227.14; 361/736; 713/194

(58) Field of Classification Search ................................
250/227.13–227.16; 713/194; 340/545.6,
340/550; 257/681; 361/730, 736, 737
See application file for complete search history.

(56) References Cited

U.S. PATENT DOCUMENTS

| | | | |
|---|---|---|---|
| 4,161,348 A | 7/1979 | Ulrich | |
| 4,447,123 A | 5/1984 | Page et al. | |
| 4,523,186 A | 6/1985 | Fiarman | |
| 5,026,141 A | 6/1991 | Griffiths | |
| 5,117,457 A | 5/1992 | Comerford et al. | |
| 5,468,990 A | 11/1995 | Daum | |
| 5,506,566 A | 4/1996 | Oldfield et al. | |
| 5,568,124 A | 10/1996 | Joyce et al. | |
| 5,675,319 A | 10/1997 | Rivenberg et al. | |
| 5,677,769 A | 10/1997 | Bendett | |
| 5,821,582 A | 10/1998 | Daum | |
| 6,215,397 B1 | 4/2001 | Lindskog | |
| 6,396,400 B1 | 5/2002 | Epstein, III et al. | |
| 6,400,268 B1 | 6/2002 | Lindskog | |

(Continued)

FOREIGN PATENT DOCUMENTS

DE    10065747    12/2000

(Continued)

*Primary Examiner*—Thanh X Luu
*Assistant Examiner*—Francis M Legasse, Jr.
(74) *Attorney, Agent, or Firm*—Shumaker & Sieffert, P.A.

(57) ABSTRACT

An anti-tamper enclosure system comprises an optical medium; at least one photosensitive sensor configured to measure at least one characteristic of a light wave transmitted in the optical medium; at least one logic circuit coupled to the at least one photosensitive sensor, the at least one logic circuit configured to initiate security measures when the at least one characteristic of the light wave changes; an enclosure coupled to the optical medium and configured to enclose the optical medium, the at least one photosensitive sensor, and the at least one logic circuit; and a plurality of attachment posts configured to be coupled to a printed circuit board, wherein at least one of the plurality of attachment posts is also coupled to the optical medium.

20 Claims, 4 Drawing Sheets

U.S. PATENT DOCUMENTS

| | | |
|---|---|---|
| 6,692,031 B2 | 2/2004 | McGrew |
| 6,838,619 B1 | 1/2005 | Soyfertis |
| 6,853,093 B2 | 2/2005 | Cohen et al. |
| 6,970,360 B2 * | 11/2005 | Sinha .......................... 361/752 |
| 7,005,733 B2 | 2/2006 | Kommerling et al. |
| 7,015,823 B1 | 3/2006 | Gillen et al. |
| 7,021,146 B2 | 4/2006 | Nash et al. |
| 7,030,974 B2 | 4/2006 | Spirin et al. |
| 7,045,730 B2 | 5/2006 | Hollar et al. |
| 2001/0033012 A1 | 10/2001 | Kommerling et al. |
| 2001/0056542 A1 | 12/2001 | Cesana et al. |
| 2002/0191788 A1 | 12/2002 | Inchalik et al. |
| 2002/0199111 A1 | 12/2002 | Clark et al. |
| 2003/0014643 A1 | 1/2003 | Asami et al. |
| 2006/0051036 A1 * | 3/2006 | Treado et al. ................ 385/117 |
| 2006/0214069 A1 * | 9/2006 | Schiebler ................... 248/74.3 |
| 2006/0261259 A1 * | 11/2006 | Beinhocker ............ 250/227.15 |
| 2007/0038865 A1 * | 2/2007 | Oggioni et al. ............. 713/178 |

FOREIGN PATENT DOCUMENTS

| | | |
|---|---|---|
| EP | 0142013 | 5/1985 |
| EP | 0509567 | 10/1992 |
| EP | 0972632 | 1/2000 |
| EP | 1045352 | 10/2000 |
| EP | 1273997 | 1/2003 |
| WO | 9502742 | 1/1995 |
| WO | 9738364 | 10/1997 |
| WO | 0123980 | 4/2001 |

* cited by examiner

ANTI-TAMPER ENCLOSURE SYSTEM COMPRISING A PHOTOSENSITIVE SENSOR AND OPTICAL MEDIUM

RELATED APPLICATIONS

This application is related to the following commonly assigned co-pending applications, each of which is hereby incorporated herein by reference:

U.S. Provisional Patent Application Ser. No. 60/827,190, filed Sep. 27, 2006 entitled "Anti-Tamper Enclosure System". The present application hereby claims priority, under 35 U.S.C. § 119(e), to U.S. Provisional Patent Application No. 60/827,190.

BACKGROUND

There is a threat to those who develop new technologies that others will reverse engineer their new technologies. The threat puts commercial businesses at risk that their competitors will reverse engineer their products to obtain proprietary technological or embedded information that is critical to maintaining the business's market share. Government system developers are at risk that enemy nations will use reverse engineering processes on government equipment, and use the stolen technology against them. For both, the economic costs can be substantial and, for governments, such reverse engineering can affect national security.

Hence, there is a need for a high reliability protection system at the card or board level to protect against the advanced techniques used to reverse engineer both software and electronic hardware systems.

SUMMARY

The above mentioned problems and other problems are resolved by the present invention and will be understood by reading and studying the following specification.

In one embodiment, an anti-tamper enclosure system is provided. The anti-tamper enclosure system comprises an optical medium; at least one photosensitive sensor configured to measure at least one characteristic of a light wave transmitted in the optical medium; at least one logic circuit coupled to the at least one photosensitive sensor, the at least one logic circuit configured to initiate security measures when the at least one characteristic of the light wave changes; an enclosure coupled to the optical medium and configured to enclose the optical medium, the at least one photosensitive sensor, and the at least one logic circuit; and a plurality of attachment posts configured to be coupled to a printed circuit board, wherein at least one of the plurality of attachment posts is also coupled to the optical medium.

DRAWINGS

Features of the present invention will become apparent to those skilled in the art from the following description with reference to the drawings. Understanding that the drawings depict only typical embodiments of the invention and are not therefore to be considered limiting in scope, the invention will be described with additional specificity and detail through the use of the accompanying drawings, in which.

In accordance with common practice, the various described features are not drawn to scale but are drawn to emphasize specific features relevant to the present invention. Like reference numbers and designations in the various drawings indicate like elements.

DETAILED DESCRIPTION

Figure 1A:
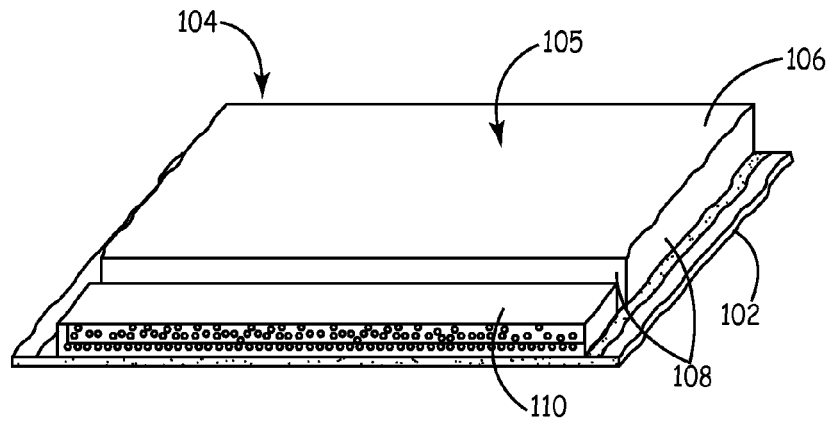
FIG. 1A shows a perspective view of an anti-tamper enclosure system according to one embodiment of the present invention.

In the following description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. It should be understood that the exemplary method illustrated may include additional or fewer steps. Furthermore, the method presented in the drawing figures or the specification is not to be construed as limiting the order in which the individual steps may be performed. The following detailed description is, therefore, not to be taken in a limiting sense.

Embodiments of the present invention utilize an optical medium coupled to an enclosure that is sized to fit an electronic board or section of the board to be protected. Embodiments of the present invention enable detection of tamper events even if power is not available during the tamper event. In addition, embodiments of the present invention minimize damage to the board or components if protected components need to be accessed such as for repair or reworking. Notably, as used herein, the terms "light wave" and "optical signal" are interchangeable.

FIG. 1A is a perspective view of an exemplary circuit board 102 with an anti-tamper enclosure system 104 according to one embodiment of the present invention. The enclosure system 104 includes an enclosure 105 comprised of a lid 106 and side walls 108. Lid 106 and side walls 108 can be made of any suitable material such as metal, metal alloys, plastics, ceramic material, etc. Anti-tamper enclosure system 104 is configured to enclose one or more electronic components (shown in FIGS. 1B and 1C) located on circuit board 102. In addition, circuit board 102 includes connector 110 which is not enclosed by enclosure system 104 in this embodiment. Connector 110 provides an interface between the electronic components on circuit board 102 and other components external to circuit board 102.

Figure 1B:
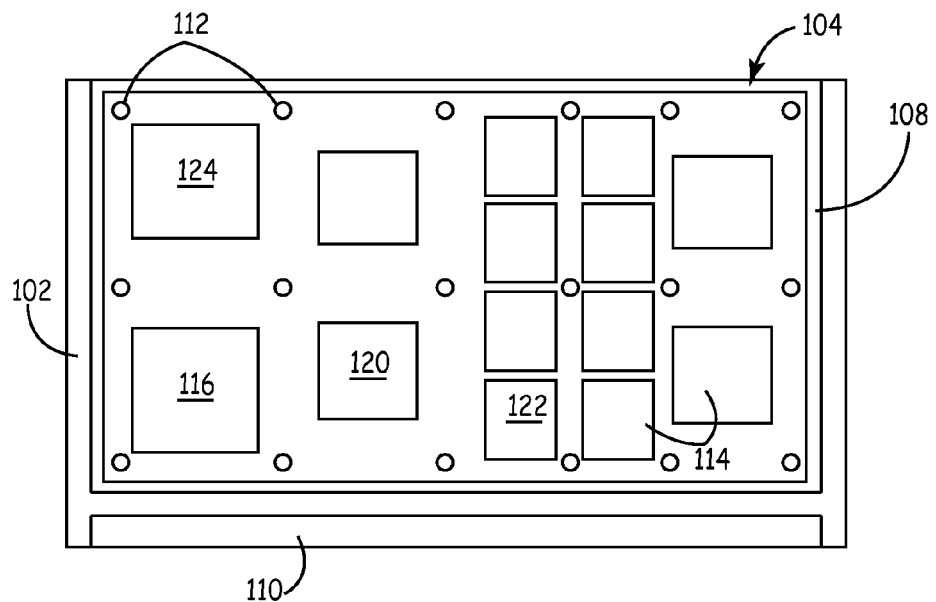
FIG. 1B shows a cross-section top view of the anti-tamper enclosure system according to one embodiment of the present invention.

FIG. 1B shows a top cut away view of the circuit board 102 with an enclosure system 104. Enclosure system 104 includes a plurality of attachment posts 112. Lid 106 (shown in FIG. 1A) is attached to circuit board 102 via the plurality of attachment posts 112. Although eighteen attachment posts 112 are shown in FIG. 1B, any appropriate number of attachment posts 112 can be used in embodiments of the present invention. Enclosure system 104 provides enhanced protection of components 114. Notably, although all of the components 114 on circuit board 102 are enclosed by enclosure system 104 in this example, it is to be understood that embodiments of the present invention are not to be so limited. In particular, components 114 can be selectively chosen to be enclosed by enclosure system 104 such that not all of the components 114 are enclosed. Components 114 include, but are not limited to, microprocessors, memory chips, and other logic devices.

Figure 1C:
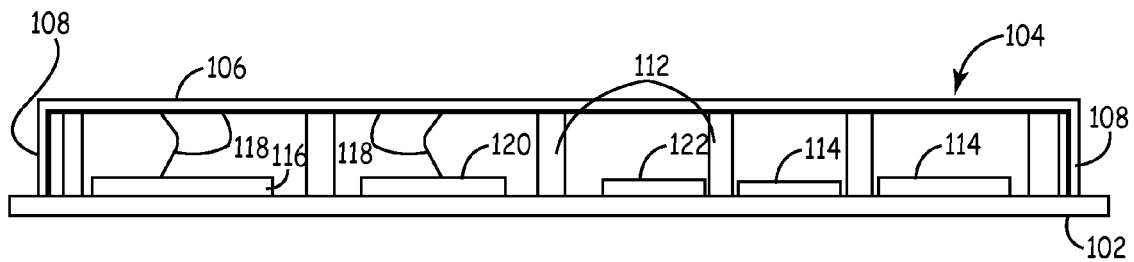
FIG. 1C shows a cross-section side view of the anti-tamper enclosure system according to one embodiment of the present invention.

Enclosure system 104 also includes optical signal generator 116, optical medium 118, and sensor 120 shown in FIG. 1C. Optical signal generator 116 produces an optical signal or wave which is transmitted over optical medium 118. In some embodiments, optical signal generator 116 produces a continuous optical signal. In other embodiments, optical signal generator 116 transmits a signal at periodic intervals over optical medium 118.

Figure 2A:
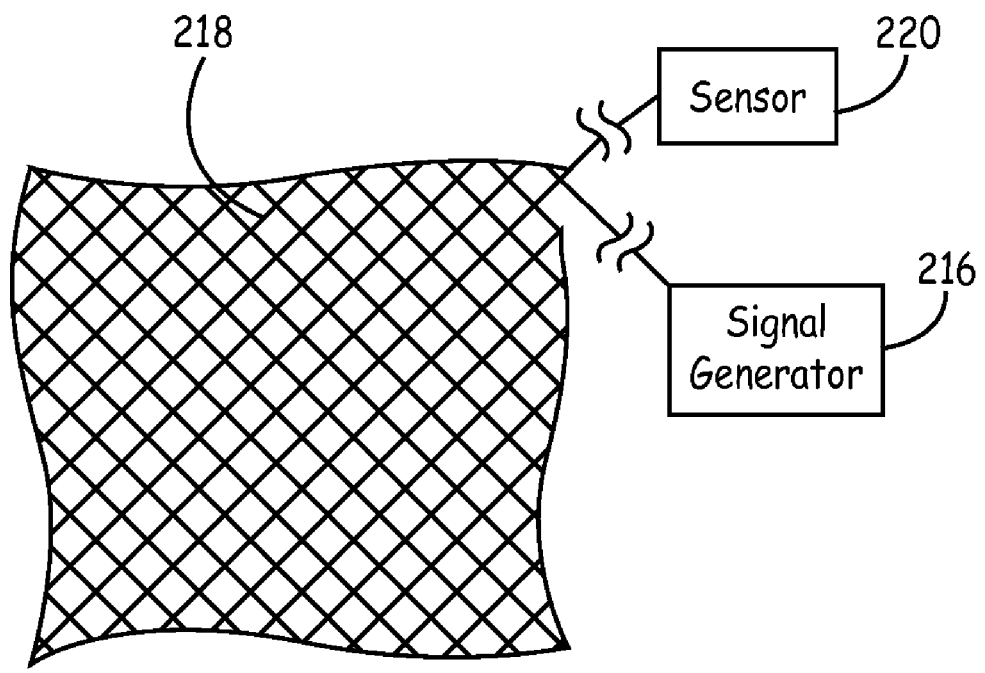
FIGS. 2A-2C show exemplary arrangements of an optical medium according to embodiments of the present invention.
Figure 2B:
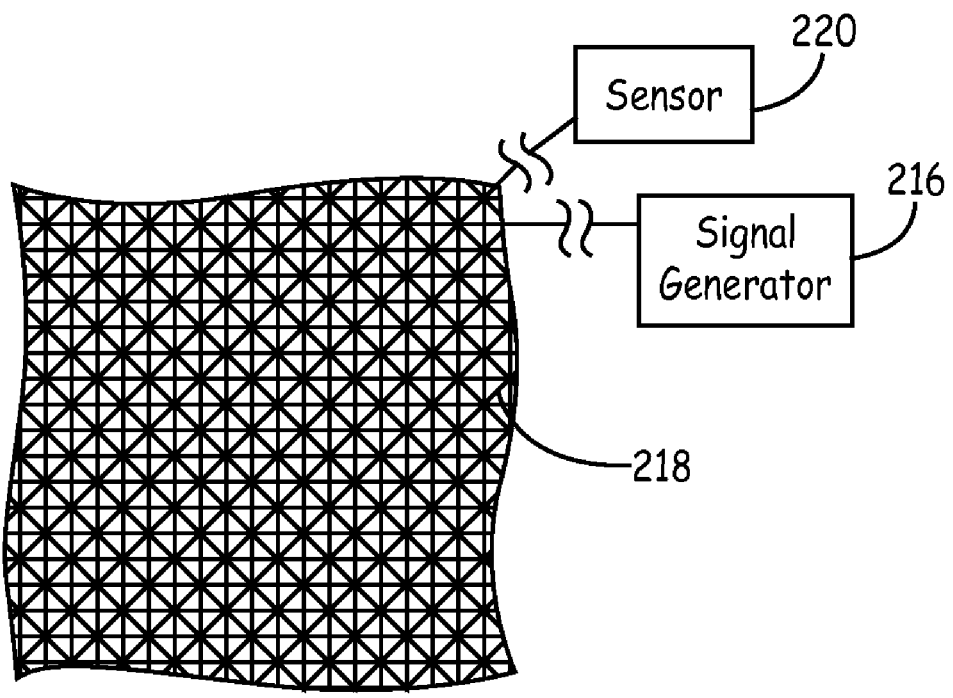
Figure 2C:
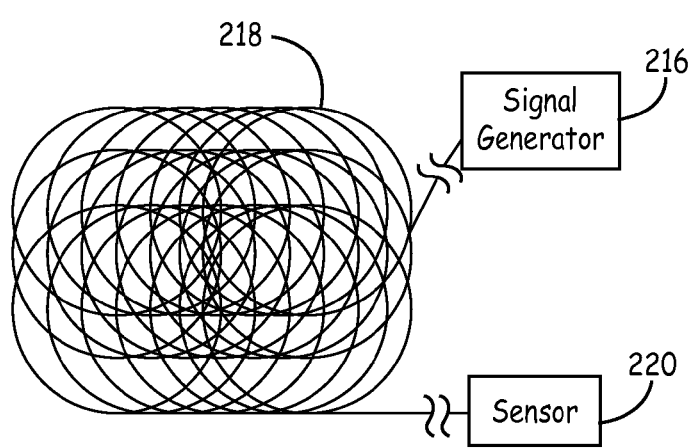

Optical medium 118 is arranged such that an attempt to access components 114 enclosed by enclosure system 104 will cause optical medium 118 to bend, stretch or break. In particular, in this embodiment, optical medium 118 is attached to the interior surface of lid 106 and walls 108 in a mesh pattern. However, in other embodiments, other arrangements can be used. For example, in some embodiments optical medium 118 is embedded inside lid 106 and walls 108. In addition, in some embodiments, optical medium 118 is arranged in other patterns such as a checkered or coil pattern. Segments of exemplary checkered, mesh, and coil patterns are shown in FIGS. 2A-2C, respectively. Each line in the pattern segments shown in FIGS. 2A-2C represents a portion of optical fiber 218. As shown in FIGS. 2A-2C, one end of fiber 218 is coupled to an optical signal generator 216 and another end is coupled to a sensor 220. In some embodiments, fiber 218 is one continuous strand that is positioned to form the patterns shown in FIGS. 2A-2C. In other embodiments, multiple strands are used. In such embodiments, each strand is coupled to other strands to form a continuous path for the optical signals.

Returning to FIG. 1, Sensor 120 is configured to measure characteristics of the optical signal in optical medium 118. For example, in some embodiments sensor 120 measures light intensity or luminosity of the optical signal. Sensor 120 then converts the measured luminosity to an electrical signal and passes the electric signal to logic circuit 122. In other embodiments, sensor 120 measures an optical pattern at a defined amplitude, frequency and/or wavelength. An exemplary simple example of an optical pattern is an on/off pattern with a frequency of 1 Hz and a wavelength of 1100 nm. In other embodiments, other optical characteristics are measured by sensor 120. Sensor 120 is implemented as a charge coupled device (CCD) with photodiodes in this embodiment. However, in other embodiments, other photosensitive sensors can be used.

Logic circuit 122 is configured to detect changes in the measured characteristics of the optical signal. Logic circuit 122 is implemented as a field-programmable gate array (FPGA) in some embodiments. In other embodiments, an application specific integrated circuit (ASIC) is used. Causes of changes to the measured characteristics include, but are not limited to, mechanical perturbations, thermal changes, and breaks or punctures in optical medium 118. Mechanical perturbations are small or large scale distortions of optical medium 118. Some small scale distortions may not be visible to the naked eye and can be caused by tensile stress, bending and squeezing, etc. which increase scattering. Thermal changes can also distort measured optical characteristics by affecting density/refractive index gradients which alter optical transmissions.

In some embodiments, logic circuit 122 compares the measured characteristic to an expected value in order to detect changes. One exemplary characteristic is luminosity. Detecting changes in luminosity is accomplished, in some embodiments, by pre-programming logic circuit 122 with a reference value representing the expected luminosity level. In other embodiments, logic circuit 122 compares each measured luminosity value with the immediate previous measured luminosity value. It is to be understood that other values can be used as the expected values in other embodiments. For example, in some embodiments an average of the prior ten measured luminosity values is used as the expected value. As stated above, other exemplary characteristics include, but are not limited to, amplitude, frequency, and wavelength. In such cases, logic circuit 122 can be pre-programmed with the expected value or can compare a measured value to previous measured values as stated above.

If the measured characteristic does not match the expected value, logic circuit 122 determines that a tamper event has occurred and initiates security measures. Security measures include, but are not limited to, physically destroying components 114, erasing data on components 114, encrypting data on components 114, etc. In addition, logic circuit 122 does not signal an alarm or take any actions which would indicate to a reverse engineer that the tamper event has been detected in some embodiments. In some such cases, logic circuit 122 can be configured to provide false data to the reverse engineer to mislead the reverse engineer.

Furthermore, in some embodiments, logic circuit 122 is configured to wait until a certain number of tamper events are detected before initiating security measures in order to minimize the possibility of responding to a false positive. Similarly, logic circuit 122 is configured with hysteresis in comparing the measured luminosity to an expected value such that distortions due to normal operation do not cause logic circuit 122 to initiate security measures in some embodiments.

Other embodiments do not require logic circuit 122 to compare the measured characteristic to an expected value. For example, in one such embodiment, logic circuit 122 is configured to derive an access code based on one or more measured characteristics. The derived access code is then provided to one or more of components 114 enclosed by enclosure system 104. The access code is used to encrypt/decrypt data. Thus, logic circuit 122 provides a dynamic access code based on characteristics of optical signals in optical medium 118. When the characteristics change, the access code changes. Since logic circuit 122 does not need to store any values to derive the access code, it is difficult for a reverse engineer to determine what the original characteristics were in order to decrypt the data. In such embodiments, initiating security measures comprises deriving a new access code based on the changed characteristic(s) of the optical signal.

In this embodiment, an internal power supply 124, such as a battery, is enclosed within enclosure 105. Power supply 124 provides power to optical signal generator 116, sensor 120, and logic circuit 122. However, in other embodiments, power supply 124 is not included. In such embodiments, optical signal generator 116, sensor 120, and logic circuit 122 use power provided by an external power source. However, with or without an internal power supply 124, embodiments of the present invention do not require that power be supplied during a tamper event in order for the tamper event to be detected. As stated above, sensor 120 measures the characteristics of the optical signals in optical medium 118. The effects of tamper events on optical medium 118, such as mechanical perturbations, breaks or punctures, cause the characteristics to change.

Therefore, even if power is not supplied when the tamper event occurs, the reverse engineer will move, bend, break, and/or puncture optical medium 118 in gaining access inside lid 106 and walls 108. In addition, at least one attachment post 112 is coupled to board 102 and to optical medium 118. In some embodiments, a high strength bonding material is used to couple attachment posts 112 to board 102 and optical medium 118. The high strength adhesive aids in breaking, bending, or otherwise damaging the optical medium when the optical medium is mechanically perturbed during a tamper event. Thus, any attempt to gain access inside enclosure system 104 will cause bending or breaking of optical medium 118. Once power is restored, logic circuit 122 will detect the change in characteristics indicating a tamper event has occurred and initiate security measures.

Figure 3:
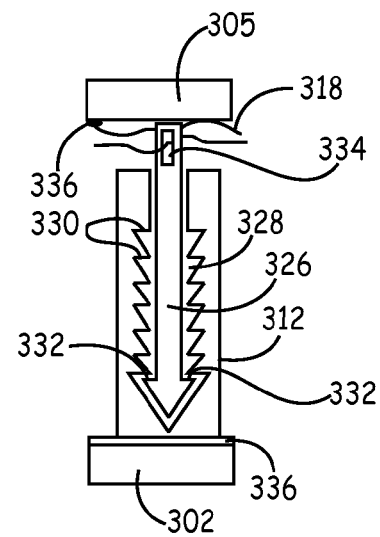
FIG. 3 shows one embodiment of an attachment post.

FIGS. 3-6 are diagrams illustrating different embodiments of attachment posts 112. In FIG. 3, attachment post 312 is comprised of a cavity 328 which is shaped with successive flanges 330. Attachment post 312 also includes an insert post 326 which is configured to fit inside cavity 328 and to slide past flanges 330. However, the shape of insert post 326 does not allow insert post 326 to be removed from cavity 328. In particular, protrusions 332 contact flanges 330 when insert post 326 is pulled outward, preventing insert post 326 from being removed from cavity 328.

Attachment post 312 is coupled to circuit board 302 via screws and/or a bonding material such as epoxy. Insert post 326 is also coupled to optical medium 318 via loop 334. In particular, a section of optical medium 318 is passed through loop 334. If a reverse engineer attempts to remove enclosure 305, optical medium 318, which is coupled to enclosure 305 and insert post 326, will be bent, moved, or broken since insert post 326 can not be extracted from cavity 328. Thus, the attempt to remove enclosure 305 is detected since the characteristics of light in optical medium 318 changes as optical medium 318 is bent, moved, or broken.

Figure 4:
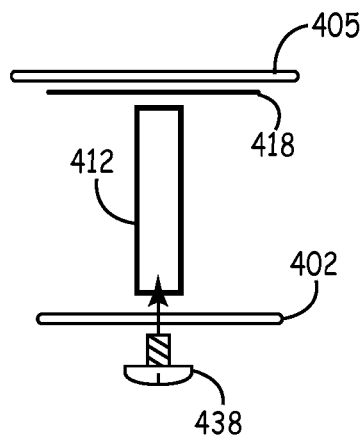
FIG. 4 shows another embodiment of an attachment post.
Figure 5:
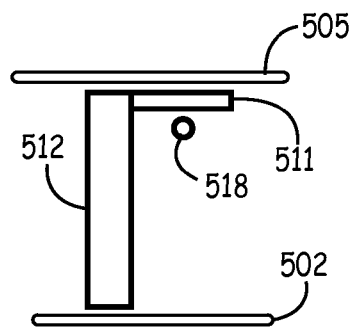
FIG. 5 shows another embodiment of an attachment post.

In FIG. 4, attachment post 412 is also coupled to a circuit board 402 via a screw or bonding material. In addition, attachment post 412 is attached to optical medium 418 and enclosure 405 via a bonding material. Hence, if a reverse engineer attempts to remove enclosure 405, optical medium 418 will be bent, moved, or otherwise distorted due to its attachment to attachment post 412. Similarly, attachment post 512 in FIG. 5 is attached to a circuit board 502 via a screw or bonding material. Attachment post 512 includes flange 511 which is configured to slide between enclosure 505 and a section of optical medium 518. Since optical medium 518 is coupled to enclosure 505, any attempt to remove enclosure 505 will cause optical medium 518 to come into contact with flange 511, thereby moving, bending, or otherwise distorting optical medium 518.

Figure 6:
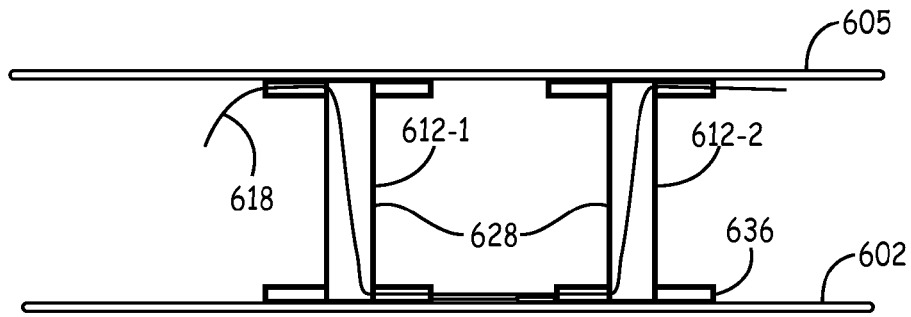
FIG. 6 shows another embodiment of an attachment post.

Attachments posts 612, in FIG. 6, each contain a cavity 628. At least a section of optical medium 618 (e.g. one or more optical fibers) is threaded through cavity 628 in attachment post 612-1 and into cavity 628 of attachment post 612-2. Optical medium 618 is coupled to enclosure 605 while attachment posts 612 are each coupled to circuit board 602. Hence, any attempt to remove enclosure 605 will cause optical medium 618 to bend, stretch, or break which results in changes in the characteristics of a light wave in optical medium 618.

Figure 7:
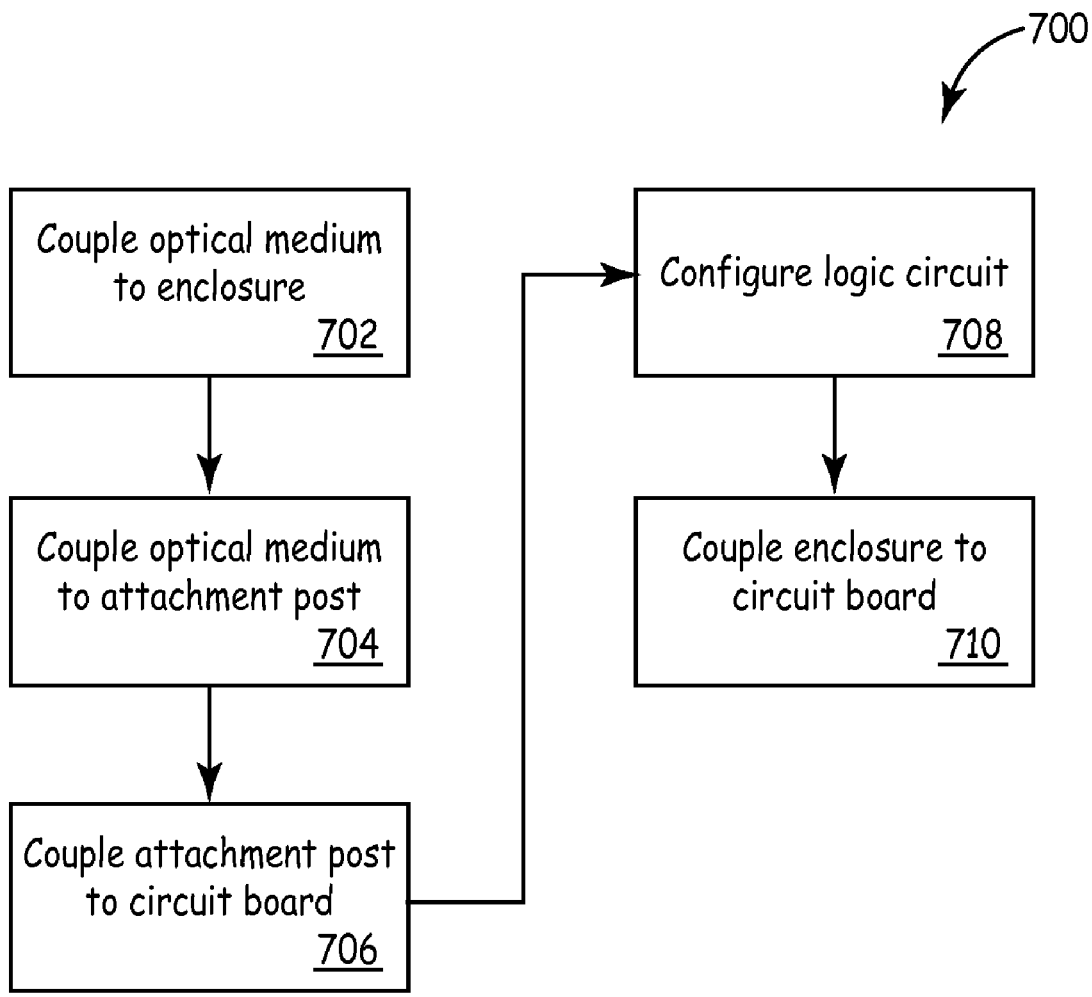
FIG. 7 is a flow chart showing a method of protecting a component on a circuit board according to one embodiment of the present invention.

FIG. 7 is a flow chart showing a method of protecting a component on a circuit board according to one embodiment of the present invention. At 702, an optical medium (e.g. optical medium 118) is coupled to an enclosure (e.g. enclosure 105). In some embodiments, the optical medium is at least partially embedded in the lid and walls of the enclosure. In other embodiments, the optical medium is attached to an interior surface of the lid and walls with a bonding material such as epoxy. At 704 the optical medium is coupled to at least one attachment post (e.g. attachment posts 112). In some embodiments, the optical medium is coupled to the attachment post using a bonding material such as epoxy. In other embodiments, the attachment post comprises an insert post and cavity as shown in FIG. 3. In such embodiments, the optical medium is attached to a loop in the insert post. In yet other embodiments, the attachment post includes a flange as shown in FIG. 5. In such embodiments, coupling the optical medium to the attachment post includes sliding the flange between the optical medium and the enclosure. In other embodiments, the attachment post includes a cavity through which at least one fiber of the optical medium is threaded as shown in FIG. 6.

At 706, a logic circuit (e.g. logic circuit 122) is configured to initiate security measures when the characteristics of a light wave in the optical medium changes as described above. In particular, the logic circuit compares a measured value of the light wave to an expected value. In some embodiments, the expected value is a value programmed at the time of manufacture based on tests of the characteristics of light in the optical medium. In other embodiments, the logic circuit compares the current characteristics measurements to the immediately previous characteristics measurement to detect changes. In addition, in some embodiments, the logic circuit is configured with hysteresis to prevent the logic circuit from initiating security measures based on changes due to normal operation.

At 708, the at least one attachment post is coupled to the circuit board. In some embodiments, the at least one attachment post is coupled using screws. In another embodiment, a bonding material such as epoxy is used to couple the attachment post to the circuit board. At 710, the enclosure is coupled to the circuit board. In some embodiments, coupling the enclosure to the circuit board comprises coupling the walls of the enclosure to the circuit board. In other embodiments, coupling the enclosure to the circuit board includes coupling the lid of the enclosure to the at least one attachment post which is coupled to the circuit board. Thus any attempt to remove the enclosure will change the characteristics of light in the optical medium as described above. The logic circuit will then initiate security measures upon detecting the change in characteristics.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. An anti-tamper enclosure system comprising:
  an optical medium;
  at least one photosensitive sensor configured to measure at least one characteristic of a light wave transmitted in the optical medium;
  at least one logic circuit coupled to the at least one photosensitive sensor, the at least one logic circuit configured to initiate security measures when the at least one characteristic of the light wave changes;
  an enclosure coupled to the optical medium and configured to enclose the optical medium, the at least one photosensitive sensor, and the at least one logic circuit; and a plurality of attachment posts configured to be directly connected to and extending generally upward from a printed circuit board and directly connected to the enclosure, wherein at least one of the plurality of attachment posts is also coupled to the optical medium.

2. The anti-tamper system of claim 1, wherein the optical medium is arranged in one of a mesh pattern, a checkered pattern, and a coil pattern.

3. The anti-tamper system of claim 1, wherein the at least one logic circuit is configured to compare a measurement of the at least one characteristic of the light wave to an expected value of the at least one characteristic of the light wave to determine if the at least one characteristic has changed.

4. The anti-tamper system of claim 1, wherein the optical medium is attached to at least one attachment post using a bonding material.

5. The anti-tamper system of claim 1, wherein the at least one attachment post coupled to the optical medium comprises a flange configured to slide between a section of the optical medium and the enclosure.

6. The anti-tamper system of claim 1, wherein the at least one attachment post coupled to the optical medium includes a cavity through which a portion of the optical medium is threaded.

7. The anti-tamper system of claim 1, wherein the at least one attachment post coupled to the optical medium comprises a cavity and an insert post configured to fit inside the cavity, wherein the optical medium is coupled to the insert post.

8. A system, comprising:
at least one component to be protected;
a printed circuit board, the at least one component attached to the printed circuit board; and
an anti-tamper enclosure system coupled to the printed circuit board, wherein the anti-tamper enclosure system comprises:
an optical medium;
at least one photosensitive sensor configured to measure at least one characteristic of a light wave transmitted in the optical medium;
at least one logic circuit coupled to the at least one photosensitive sensor, the at least one logic circuit configured to initiate security measures when the at least one characteristic of the light wave changes;
an enclosure coupled to the optical medium and configured to enclose the at least one component; and
a plurality of attachment posts directly connected to and extending generally upward from the circuit board and directly connected to the enclosure, wherein at least one of the plurality of attachment posts is coupled to the optical medium.

9. The anti-tamper system of claim 8, wherein the optical medium is arranged in one of a mesh pattern, a checkered pattern, and a coil pattern.

10. The anti-tamper system of claim 8, wherein the at least one logic circuit is configured to compare a measurement of the at least one characteristic of the light wave to an expected value of the at least one characteristic of the light wave to determine if the at least one characteristic has changed.

11. The anti-tamper system of claim 8, wherein the optical medium is attached to at least one attachment post using a bonding material.

12. The anti-tamper system of claim 8, wherein the at least one attachment post coupled to the optical medium comprises a flange configured to slide between a section of the optical medium and the enclosure.

13. The anti-tamper system of claim 8, wherein the at least one attachment post coupled to the optical medium includes a cavity through which a portion of the optical medium is threaded.

14. The anti-tamper system of claim 8, wherein the at least one attachment post coupled to the optical medium comprises a cavity and an insert post configured to fit inside the cavity, wherein the optical medium is coupled to the insert post.

15. A method of protecting a component on a circuit board, the method comprising:
coupling an optical medium to an enclosure;
coupling the optical medium to at least one attachment post;
configuring a logic unit to initiate security measures when at least one characteristic of a light wave in the optical medium changes;
directly connecting the at least one attachment post to the circuit board, wherein the at least one attachment post extends generally upward from the circuit board;
directly connecting the attachment post to the enclosure; and
coupling the enclosure to the circuit board.

16. The method of claim 15, wherein coupling the optical medium to at least one attachment post comprises:
coupling the optical medium to an insert post of the at least one attachment post; and
inserting the insert post into a cavity of the at least one attachment post.

17. The method of claim 15, wherein coupling the optical medium to at least one attachment post comprises threading a section of the optical medium through a cavity in the at least one attachment post.

18. The method of claim 15, wherein coupling the optical medium to at least one attachment post comprises coupling the optical medium to the at least one attachment post using a bonding material.

19. The method of claim 15, wherein coupling the optical medium to the at least one attachment post comprises sliding a flange of the attachment post between a section of the optical medium and the enclosure.

20. The method of claim 15, wherein coupling the optical medium to the enclosure comprises one of:
coupling the optical medium to an interior surface of the enclosure; and
embedding at least a portion of the optical medium inside the enclosure.

* * * * *